UNITED STATES PATENT OFFICE.

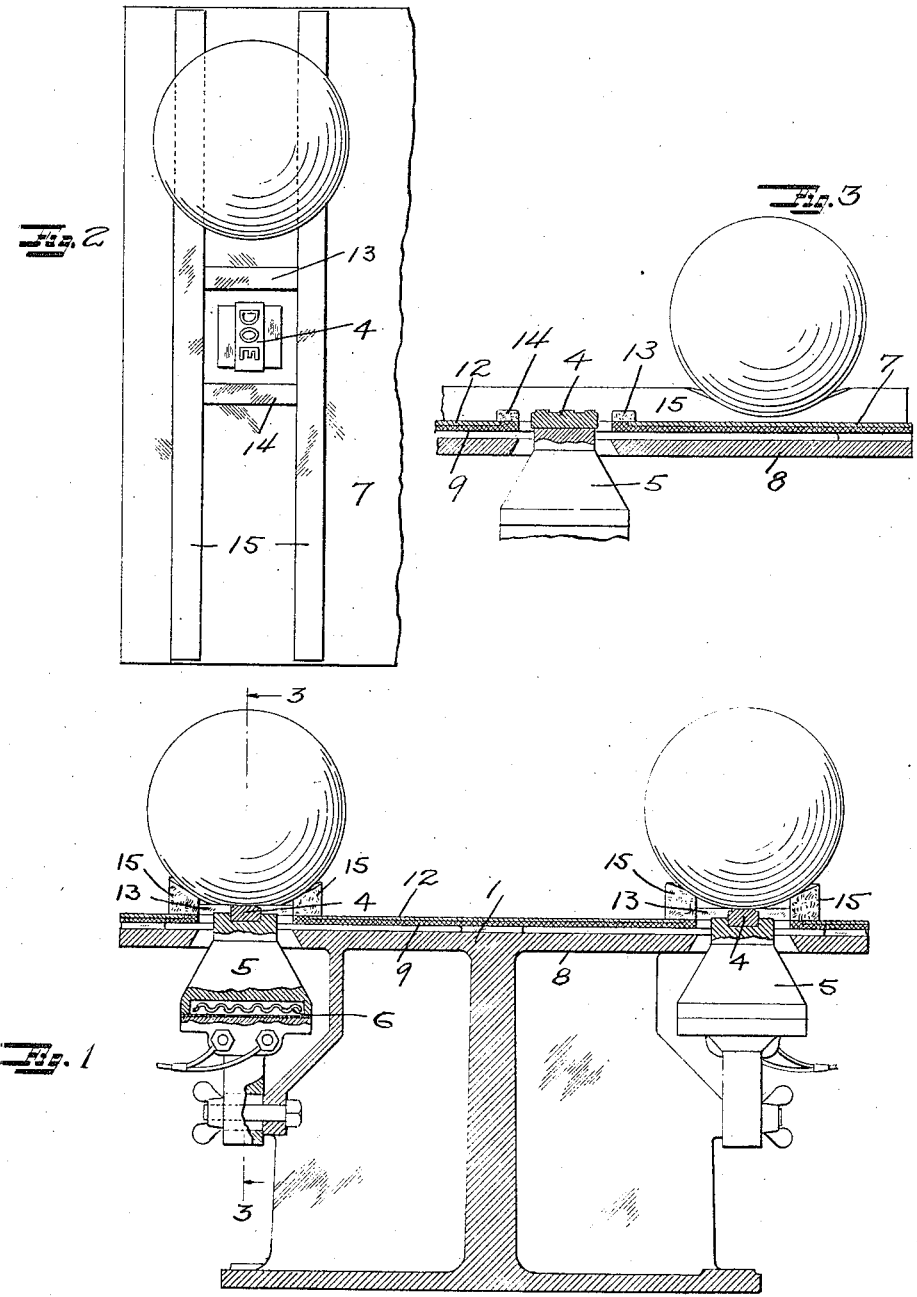

FRANK AHLBURG, OF SAN FRANCISCO, CALIFORNIA.

FRUIT-MARKING APPARATUS.

1,237,442.  Specification of Letters Patent.  Patented Aug. 21, 1917.

Application filed November 22, 1915. Serial No. 62,760.

*To all whom it may concern:*

Be it known that I, FRANK AHLBURG, a subject of Germany, and a resident of the city and county of San Francisco, State of California, have invented a certain new and useful Fruit-Marking Apparatus, of which the following is a specification.

The invention relates to an apparatus for imprinting marks, trade marks or other delineations on fruit.

The object of the invention is to provide an apparatus by which fruit may be quickly and efficiently marked.

Another object of the invention is to provide means for guiding the fruit over the marking die.

A further object of the invention is to provide means for positioning the fruit with respect to the die.

The invention possesses other advantageous features, some of which, with the foregoing, will be set forth at length in the following description, where I shall outline in full that form of the invention which I have selected for illustration in the drawings accompanying and forming part of the present specification. In said drawings, I have shown only one specific form of my generic invention, but it is to be understood that I do not limit myself to such form, because my invention may be embodied in a multiplicity of forms, each being a species of my invention.

Referring to said drawings:

Figure 1 is a vertical section of one form of apparatus of my invention involving the use of two dies.

Fig. 2 is a plan or top view of one-half of the apparatus shown in Fig. 1.

Fig. 3 is a vertical section taken on the line 3—3 Fig. 1.

The apparatus of my invention comprises a die 4, having thereon the delineations which it is desired to mark on the fruit, the die being preferably formed of metal. The die is firmly fitted, for efficient thermal communication, in a metallic heat storage element 5 which is preferably heated by an electrical heating element 6 inclosed therein. The die may be made integral with the heat storage element, but is preferably detachable therefrom, so that different dies may be employed with one heat element.

The die is preferably arranged in an aperture in a table 7, so that the die projects above the level of the table. The table consists of a suitable base-plate 8 preferably formed of metal, above and spaced from which is arranged a sheet of asbestos 9 which is covered by a sheet metal plate 12.

The fruit is marked by rolling it over the die, so that the skin of the fruit is in momentary contact with the heated die. It is advisable, in producing a perfect mark, that the times of contact between the different parts of the die and the skin of the fruit be the same, or in other words, that the fruit be moved over the die at a constant speed. The fruit is brought by hand to the die and means are provided for properly positioning the fruit with respect to the die, before it is rolled over the die.

Arranged in front of the die and close thereto is a step or abutment 13, preferably formed of felt or other comparable material, the upper surface of which lies in substantially the same plane as the upper face of the die. In marking, the fruit is grasped in the hand and brought into contact with the abutment, thus insuring its proper positioning and is then quickly rolled over the die. A similar abutment 14 is also preferably arranged behind the die. The first abutment, while positioning the fruit, allows the fruit to be marked without causing the first letter on the die to be longer in contact with the fruit than the remaining letters and the second abutment serves the same purpose for the last letter of the die.

Means are also provided for minimizing any transverse rolling movement of the fruit as it is being moved over the die, thereby preventing distortion of the mark. Arranged on the table at each side of the die are guides 15, preferably formed of felt, which contact with the fruit and prevent it from rolling sidewise. The upper faces of the guide strips are preferably inclined downward toward the die to provide a wide resting surface for the fruit. The dies are usually made longer in one direction than in the other and the guide strips 15 are arranged parallel to the longer side of the die.

I claim:

1. In an apparatus for marking fruit, a die, means for heating the die, an abutment of yielding material adjacent the end of said die toward which the fruit is moved, and a similar abutment at the end of said die from which the fruit is moved.

2. In an apparatus for marking fruit, a die, means for heating the die and an abutment arranged at that end of the die toward which the fruit is moved, the upper face of the abutment lying in substantially the same plane as the upper face of the die.

3. In an apparatus of the character described, a stationary die, means for heating the die, and guides having faces sloping inwardly to form a channel arranged at opposite sides of said die.

4. In an apparatus for marking fruit, a stationary die, means for heating the die, and guides of soft material having surfaces inclined inwardly to form a channel therebetween arranged at opposite sides of said die and spaced apart therefrom.

In testimony whereof, I have hereunto set my hand at San Francisco, California, this 16th day of November, 1915.

FRANK AHLBURG.

In presence of—
H. G. Prost.